Nov. 14, 1967   A. R. SCHERTZ   3,352,341
FAST-ACTION NUT ASSEMBLY
Filed Oct. 20, 1965
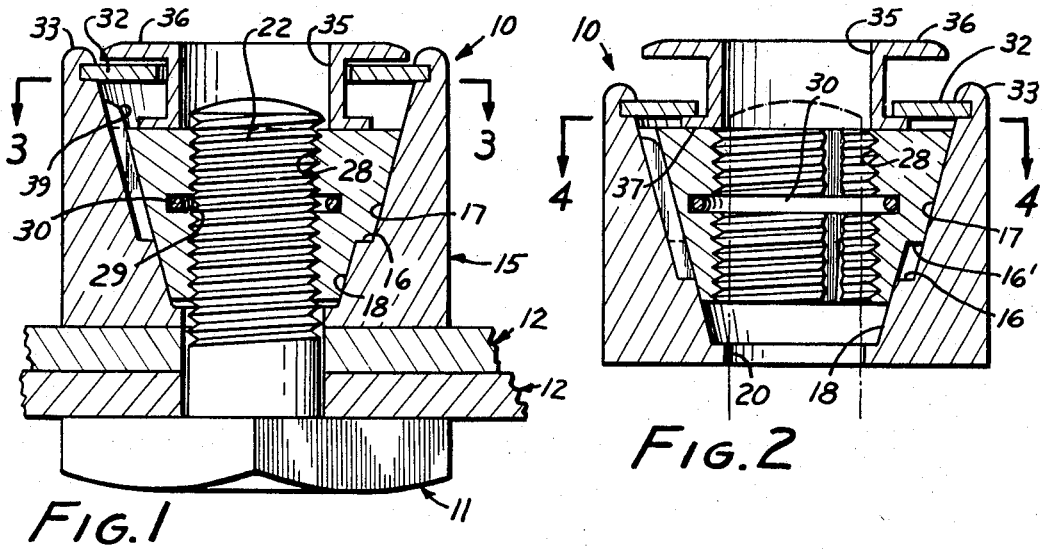
FIG.1   FIG.2
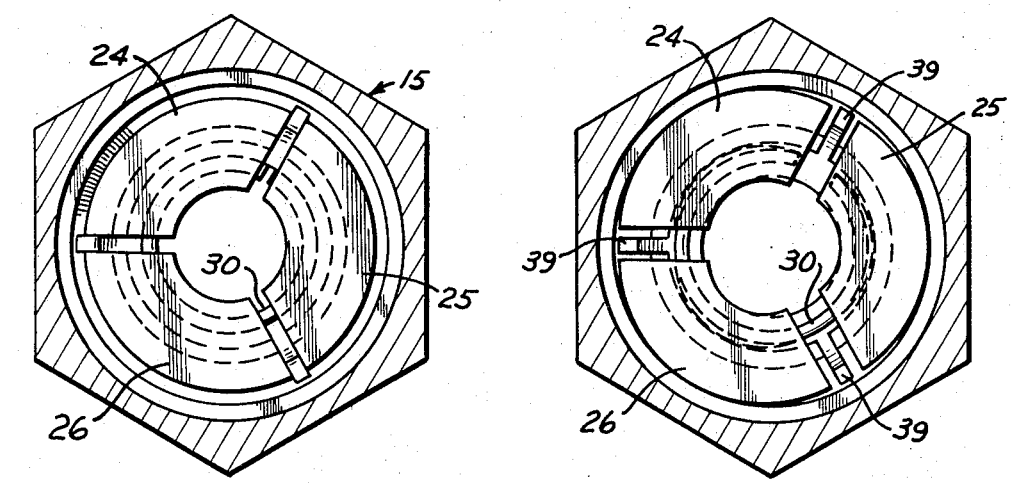
FIG.3   FIG.4
INVENTOR.
ARTHUR R. SCHERTZ
BY 
ATTORNEY.

United States Patent Office 3,352,341
Patented Nov. 14, 1967

3,352,341
FAST-ACTION NUT ASSEMBLY
Arthur R. Schertz, Taft, Calif., assignor of fifty percent to
Eva N. Schertz, Taft, Calif.
Filed Oct. 20, 1965, Ser. No. 498,738
3 Claims. (Cl. 151—19)

ABSTRACT OF THE DISCLOSURE

The unitary nut assembly comprises a nut ring having a conically stepped bore formed by a pair of frusto-conical surfaces interconnected by a narrow shoulder at their inner ends near the mid-length of the nut ring. A plurality of threaded arcuate segments have complementally shaped exterior surfaces spring-biased into expanded seating engagement with these frusto-conical surfaces and are held against rotary movement relative to the nut ring by stops carried on the nut ring and located between the adjacent axial edges of the segments. The smaller end of the nut ring includes an inwardly projecting flange effective to guide the nut assembly over a threaded shank with the threads of the expanded segments disengaged with the shank threads. The opposite end of the nut assembly is provided with a captive manipulating ring unattached to the segments but effective to displace them along the conical bore and into engagement with the shank threads prior to wrenching the nut assembly.

---

This invention relates to threaded fasteners and more particularly to a unique and improved fast-action nut assembly adapted to be telescoped onto and from a threaded shank without relative rotary movement until the nut assembly bears against a workpiece and thereupon tightens against the workpiece with negligible wrenching.

One of the serious shortcomings and disadvantages of threaded fasteners is the requirement for multiple rotation of the nut relative to a shank merely to bring the full length of the nut into registry with the threads of a cooperating shank; additional rotation is required to remove looseness between the parts and to compensate for elastic deformation of the components attending full loading. It is, therefore, apparent that a major portion of the relative rotary movement serves no essential or useful purpose and could easily be dispensed with without detriment provided a satisfactory expedient could be found for assembling the nut over the shank up to the point of loading.

Various attempts have been made in the past to accomplish this objective but the devices provided for this purpose are subject to numerous disadvantages and shortcomings sought to be avoided by the present invention. For example, prior fast-action nut units utilize an excessive number of components many of which have a complex configuration difficult and costly to manufacture. In some, certain features must be made to high tolerance specifications. Additionally, prior proposals are unnecessarily bulky and have grossly inadequate load-carrying ability, particularly in view of the space occupied by the constituent components. Some of these designs utilize intricate machining operations which are both costly to perform and time consuming. Furthermore, the designs previously advanced are difficult to assemble and disassemble and are easily fouled by dirt and foreign matter.

By the present invention there is provided a simple, rugged, fast-action nut assembly having a minimum number of components mutually cooperating in a highly effective and efficient manner. The assembly comprises, as principal components, a nut ring having a stepped or shouldered conical surface appropriately described as a foreshortened cone in that the midportion of the conical surface is omitted permitting the two ends to move together opposite a narrow, generally radial shoulder positioned intermediate the opposite end faces of the ring. This narrow shoulder cooperates with a similar shoulder formed on the exterior of a plurality of threaded segments to limit relative axial nesting movement of these parts when the segment threads are properly mated with the shank threads.

The threaded segments preferably include a common cooperating spring member such as a split ring spring urging the segments to expand outwardly and toward the larger end of the conical bore through the nut ring so that the nut assembly can be telescoped freely over a threaded shank. When the nut ring is seated against the workpiece the segment threads are cammed into mating engagement with the shank, and automatically are stopped by engagement of the mentioned shoulders thereby avoiding jamming and high friction losses. Relative rotary movement of the ring and shank then serves to tighten the nut assembly fully after a very short wrenching operation.

Removal of the nut assembly is accomplished quickly by equally short reverse wrenching allowing the spring to expand the segments out of engagement with the shank threads, whereupon the nut assembly can be freely withdrawn axially of the shank irrespective of its length.

Accordingly, it is a primary object of the present invention to provide a simple, rugged, highly effective and efficient fast-action nut assembly.

Another object of the invention is the provision of a fast-action nut assembly having a conical surface extending axially therethrough and adapted to be in continuous supporting contact with the complementally shaped exterior surfaces of a plurality of threaded arcuate segments.

Another object of the invention is the provision of a simple compact highly-efficient fast-action nut assembly having a plurality of threaded segments constantly urged expanded away from one another by a common simple spring.

Another object of the invention is the provision of a fast-action nut assembly having a nut ring provided with a stepped conical bore formed in two axially aligned sections effective to limit inward camming of cooperating threaded segments designed to mate with a threaded shank.

Another object of the invention is the provision of a fast-action nut assembly having a plurality of arcuate threaded segments held assembled to the nut ring by keeper means secured to the inner rim of the larger end of its nut ring.

Another object of the invention is the provision of a fast-action nut assembly having a plurality of arcuate threaded segments of conical configuration on their outer face and complemental to the cooperating conical surface of a nut ring and including means for shifting the segments simultaneously into mating engagement with shank threads in opposition to an expansion spring common to said arcuate segments.

Another object of the invention is a provision of an improved fast-action nut assembly and an improved inexpensive method of manufacturing the same utilizing cold forging techniques.

These and other more specific objects will appear upon reading the following specification and claims and upon considering in connection therewith the attached drawing to which they relate.

Referring now to the drawing in which a preferred embodiment of the invention is illustrated.

FIGURE 1 is an axial sectional view through a threaded fastener employing a preferred embodiment of the invention fast-action nut assembly and showing the position of the parts under assembled and loaded condition;

FIGURE 2 is an axial sectional view through the nut assembly per se showing the threaded segments retracted in readiness for assembly over a shank;

FIGURE 3 is a transverse sectional view taken along line 3—3 on FIGURE 1; and

FIGURE 4 is a transverse sectional view taken along line 4—4 on FIGURE 2.

Referring initially more particularly to FIGURES 1 and 2, there is shown a preferred embodiment of a threaded fastener utilizing a preferred embodiment of the invention nut assembly designated generally 10. The fastener includes any typical threaded shank or bolt 11 here shown as passing through aligned holes in workpieces 12, 12 and into nut assembly 10.

Nut assembly 10 includes a high-strength continuous ring 15 suitably formed on its exterior surface for wrenching. This ring is formed interiorly thereof with a conical surface which may be appropriately described as a foreshortened cone by reason of having its midportion omitted and its two end sections shifted axially toward one another and interconnected by a relatively narrow radial shoulder 16. Disposed to one side of this shoulder is a relatively large diameter section 17 of the conical surface whereas the smaller conical section 18 lies on the other side of the shoulder with its surface parallel to the surface of section 17. The smaller end of section 18 terminates at the base of an annular inwardly projecting flange 20 having an opening therethrough sized to have a loose sliding fit over the crests of threads 22 on the shank of bolt 11. Flange 20 will be understood as providing a guide pilot facilitating the smooth telescopic assembly of the nut assembly over the shank threads without risk of hang-up on these threads. To this end the axial thickness of the flange is preferably greater than the distance between the adjacent thread crests.

Seated against conical sections 17 and 18 are a plurality of arcuate threaded segments 24, 25, 26, each having a stepped conical exterior surface complemental to sections 17, 18. Thus shoulders 16' on these segments are complemental in size and shape with shoulder 16 of the nut ring and cooperate with the latter in limiting axial shift of the segments toward the smaller end of the nut. Each of segments 24, 25, 26 is provided with threads 28 on its interior surface sized to mate with threads 22 of the bolt shank. The threaded segments are also formed interiorly with a common annular groove 29 seating a stiff split ring spring 30 continuously urging the segments to expand outwardly and upwardly along conical sections 17, 18. The arcuate segments have an axial length appreciably shorter than the nut ring with the lower end of the segments terminating short of pilot flange 20 as the segments bottom out against shoulder 16. The upper ends of the segments terminate sufficiently inwardly of the outer end of the ring to permit the segments to expand to the position shown in FIGURE 2 wherein threads 28 are fully disengaged from the shank threads.

Secured to the outer end of ring 15 is an inwardly projecting keeper ring 32 suitably held in assembled relation as by swaging over the upper rim edge 33 of the nut. Keeper 32 serves not only to hold the segments assembled within the conical bore but also to hold a spool-like manual operator 35 having flanges 36 and 37 positioned on the opposite sides of keeper 32.

A further feature of the construction is the provision of means for holding the threaded segments against relative rotation comprising shallow ribs 39 projecting inwardly from and integral with conical section 17. As shown, these ribs merge at their inner ends with shoulder 16.

The operation and use of the described fast-action nut assembly will be quite apparent from the foregoing description of its construction details. Normally, spring 30 holds the arcuate segments 24, 25, 26 expanded away from one another in the outer larger portion of conical section 17 with manual operator 35 supported as shown in FIGURE 2. The nut assembly is now properly conditioned and in readiness to be telescoped over a threaded shank. This operation is carried out effortlessly as pilot flange 20 acts to hold the nut centered concentrically of the shank while the nut glides over the shank and into snug fitting engagement with workpiece 12. The parts being held firmly in this position, the operator depresses operator 35 thereby shifting the threaded segments along the conical surface as they are cammed into mating engagement with the shank threads. As this occurs, shoulders 16, 16' engage thereby positively arresting further axial and radial movement with the smaller end of the segments spaced inwardly slightly from the adjacent edge of pilot flange 20. All exterior surfaces of the segments are uniformly in direct contact with the juxtaposed conical surfaces of the nut ring.

Disassembly is accomplished equally expeditiously, it merely being necessary to reverse the wrenching operation whereupon spring 30 is effective to cam the lightweight nut segments outwardly and upwardly out of engagement with the shank threads. This having been accomplished, the entire nut assembly is readily lifted from the shank as pilot flange 20 acts to hold the threaded segments out of engagement with the shank threads.

While the particular fast-action nut assembly herein shown and disclosed in detail is fully capable of attaining the objects and providing the adavntages hereinbefore stated, it is to be understood that it is merely illustrative of the presently preferred embodiments of the invention and that no limitations are intended to the details of construction or design herein shown other than as defined in the appended claims.

I claim:

1. A fast-action threaded nut assembly comprising an outer nut ring having a generally conical axial bore therethrough the surface of which is inclined to the axis of said nut ring by an angle ranging between 10 and 20 degrees, said conical bore including a pair of frusto-conical sections the larger end of one of which opens through the upper end of said nut ring and the smaller end of which merges with the other edge of a radially narrow inwardly projecting shoulder the inner end of said shoulder merging with the larger end of the other of said frusto-conical sections and the smaller end of the latter terminating at the inner edge of a radially narrow inwardly projecting annular guide flange sized to have a loose sliding fit over the crests of a threaded shank for said nut assembly, a plurality of arcuate segments formed with helical threads crosswise of their interior surfaces and having a pair of frusto-conical exterior surfaces interconnected by a radially narrow shoulder and complemental to and seated against the conical axial bore through said nut ring, the threads of said segments being mateable with the complemental helical thread of a shank adapted for use with said nut assembly, spring means common to said arcuate segments and effective to expand said segments outwardly and toward the larger diameter end of said conical bore through said nut ring, and means to prevent any substantial relative rotary movement between said segments and said nut ring during wrenching of said nut assembly, said means for preventing any substantial relative rotary movement between said arcuate segments and said nut ring comprises narrow ribs extending axially of said one frusto-conical section with the inner ends thereof terminating at said annular shoulder interconnecting said pair of frusto-conical sections and having their inner edges tapering substantially similarly to the taper of the smaller one of said frusto-conical sections.

2. A nut assembly as defined in claim 1 characterized in that the upper rim edge of the larger diameter end of said one frusto-conical section is provided with an inwardly opening groove, a retainer ring seated in said groove and projecting inwardly over said conical bore and effective to hold said arcuate segments loosely assembled within said nut ring, and manually manipulatable ring means held loosely assembled within said retainer ring, said manually manipulatable ring means having limited freedom of movement axially of said nut ring and being free of connection to said arcuate segments but engageable with the adjacent ends thereof to depress them toward the smaller end of said conical bore whereby said segments are forced inwardly to engage the threads of a shank after said nut assembly has been telescoped thereover to a position for wrenching.

3. A nut assembly as defined in claim 2 characterized in that said manually manipulatable ring means is a spool-like member having flanges at the opposite ends thereof projecting radially outwardly in overlapping relation to to the inner edge of the retainer ring for said arcuate segments.

References Cited

UNITED STATES PATENTS

| | | | |
|---|---|---|---|
| 786,725 | 4/1905 | Bryce | 151—19 |
| 1,069,011 | 7/1913 | Hicks | 151—19 |
| 2,489,613 | 1/1949 | Beswick | 85—33 |
| 2,814,325 | 11/1957 | Shur | 151—19 |
| 3,157,215 | 11/1964 | Zahodiakin | 151—19 |

FOREIGN PATENTS

| | | |
|---|---|---|
| 33,680 | 9/1924 | Denmark. |
| 932,677 | 12/1947 | France. |
| 717,229 | 2/1942 | Germany. |
| 670,778 | 4/1952 | Great Britain. |
| 736,008 | 8/1955 | Great Britain. |
| 81,356 | 6/1919 | Switzerland. |
| 124,396 | 2/1928 | Switzerland. |
| 302,654 | 1/1955 | Switzerland. |

CARL W. TOMLIN, *Primary Examiner.*

M. PARSONS, JR., *Assistant Examiner.*